J. McCULLOUGH.
EARTH-AUGER.
No. 187,028. Patented Feb. 6, 1877.
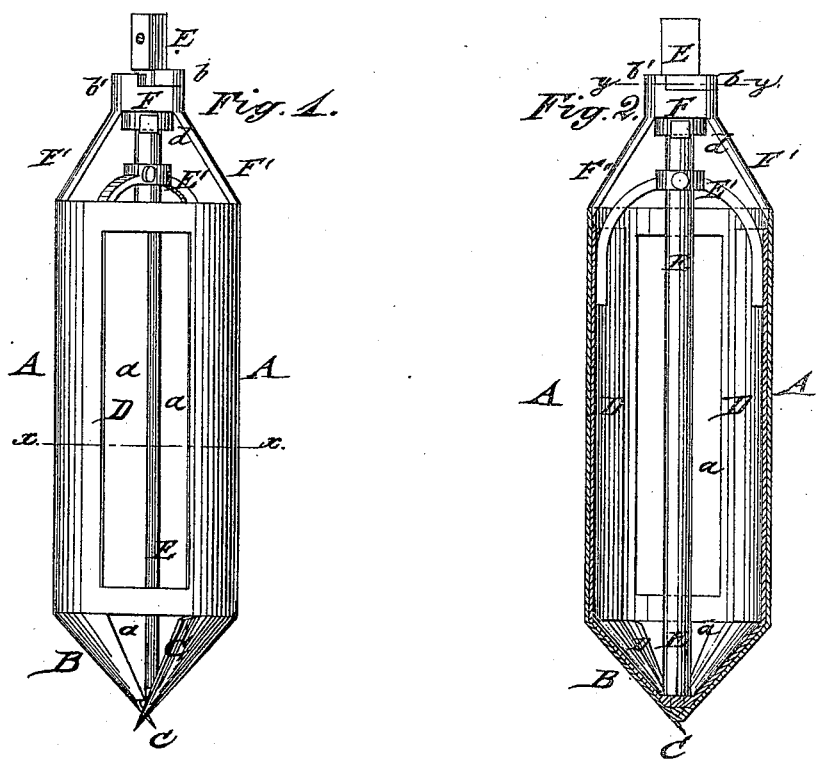
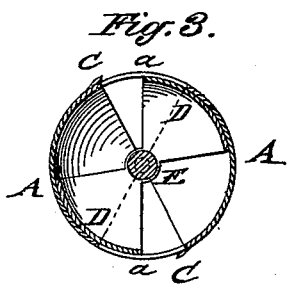
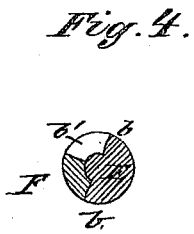
WITNESSES:
H. Rydquist
John Goethals
INVENTOR:
J. McCullough
BY
ATTORNEYS.

UNITED STATES PATENT OFFICE.

JAMES McCULLOUGH, OF PENSACOLA, FLORIDA.

IMPROVEMENT IN EARTH-AUGERS.

Specification forming part of Letters Patent No. 187,028, dated February 6, 1877; application filed September 30, 1876.

*To all whom it may concern:*

Be it known that I, JAMES McCULLOUGH, of Pensacola, in the county of Escambia and State of Florida, have invented a new and Improved Well-Auger, of which the following is a specification:

In the accompanying drawing, Figure 1 represents a side elevation, Fig. 2 a vertical central section, and Figs. 3 and 4 are vertical horizontal sections respectively on the lines $x$ $x$, Fig. 1, and $y$ $y$, Fig. 2, of my improved well-auger.

Similar letters of reference indicate corresponding parts.

The object of my invention is to provide, for well-boring in sandy soils, an improved auger, by which all the sand and water in the same is retained for being raised, and thereby the use of sand-pumps in quicksand and water dispensed with.

The invention will first be described in connection with the drawing, and then pointed out in the claim.

In the drawing, A represents a cylindrical auger, with conical bottom part B, having diametrical knife-edges C, for cutting through the earth or sand. The auger is provided at the main part and conical point with one or more openings, $a$, that may be closed by a valve, D, sliding within the auger, and corresponding in shape to the same, the valve being extended down to the point of the auger, and rigidly applied to the center shaft E, both at the lower end and also by arms and a screw-collar, E', to the upper part of the same. The center shaft E is made to turn on its axis in bearings at the lowermost point of the auger, and in a collar or yoke, F, supported on arms F' at the top of the auger.

The sliding valve D is operated by giving the center shaft a quarter turn, the motion of the valve being stopped in either direction by a clutch mechanism of the center shaft E and yoke F.

The clutch is formed of a projecting cam, $b$, of shaft E, that slides on, and is stopped by, the recessed top part $b'$ of the yoke.

By turning the center shaft in one direction, the auger is opened for work, taking in the sand, earth, and water, and retaining the same, by turning the shaft in opposite direction and closing the openings of the auger by the valve. The auger is then raised for being emptied, the center shaft being attached to the auger, to prevent displacement of the valve in vertical direction by a collar, $d$, keyed to the shaft below the yoke F.

The auger will bore in loose earth and sand, and bring up, by closing the valve or valves, anything taken up by the same.

Having thus described my invention, I claim as new and desire to secure by Letters Patent—

The internal valve D, extending down into the hollow conical point and covering the openings therein, as and for the purpose set forth.

JAMES McCULLOUGH.

Witnesses:
WM. W. I. KELLY,
F. C. HUMPHREYS.